(12) United States Patent
Tillgren et al.

(10) Patent No.: US 10,536,896 B2
(45) Date of Patent: Jan. 14, 2020

(54) ESTABLISHING A WIRELESS CONNECTION TO A CELLULAR NETWORK

(71) Applicant: SONY MOBILE COMMUNICATIONS INC., Tokyo (JP)

(72) Inventors: Magnus Tillgren, Malmo (SE); Magnus Johansson, Dosjebro (SE); Henrik Sundström, Sodra Sandby (SE)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 0 days.

(21) Appl. No.: 16/355,719

(22) Filed: Mar. 16, 2019

(65) Prior Publication Data

US 2019/0320384 A1 Oct. 17, 2019

(30) Foreign Application Priority Data

Apr. 16, 2018 (SE) ...................................... 1850431

(51) Int. Cl.
*H04W 4/021* (2018.01)
*H04W 48/18* (2009.01)
(Continued)

(52) U.S. Cl.
CPC ........... *H04W 48/18* (2013.01); *H04W 4/021* (2013.01); *H04W 4/029* (2018.02); *H04W 48/16* (2013.01); *H04W 64/00* (2013.01); *H04W 76/10* (2018.02)

(58) Field of Classification Search
CPC ..... H04W 48/18; H04W 4/029; H04W 76/10; H04W 4/021; H04W 48/16; H04W 64/00;
(Continued)

(56) References Cited

U.S. PATENT DOCUMENTS

2004/0203893 A1* 10/2004 Kotzin .................. H04W 48/18
455/456.1
2007/0004404 A1* 1/2007 Buckley ................ H04W 48/16
455/434
(Continued)

FOREIGN PATENT DOCUMENTS

| EP | 1739991 A1 | 1/2007 |
| EP | 2992649 A1 | 3/2016 |

(Continued)

OTHER PUBLICATIONS

Swedish Search Report and Office Action from corresponding Swedish Patent Application No. 1850431-6, dated Nov. 21, 2018, 7 pages.
(Continued)

Primary Examiner — Nathan S Taylor
(74) Attorney, Agent, or Firm — Tucker Ellis LLP

(57) ABSTRACT

A method performed in an electronic device for establishing, in an energy-efficient way, a wireless connection to a cellular network, where the electronic device is configured to support wireless connection to a plurality of cellular networks. The method includes obtaining a current position of the electronic device; determining, as a function of the current position, a set of available cellular networks, said set being a subset of the plurality of cellular networks that are supported by the electronic device; and scanning the set of available cellular networks.

18 Claims, 3 Drawing Sheets

(51) Int. Cl.
*H04W 48/16* (2009.01)
*H04W 76/10* (2018.01)
*H04W 4/029* (2018.01)
*H04W 64/00* (2009.01)

(58) Field of Classification Search
CPC . H04W 24/02; H04W 52/0258; H04W 84/00; H04W 88/06; H04W 8/18; H04W 8/22
USPC ............ 455/456.1, 434, 414.1, 432.1, 435.2; 705/332, 341; 370/252, 311
See application file for complete search history.

(56) References Cited

U.S. PATENT DOCUMENTS

| | | | |
|---|---|---|---|
| 2010/0026570 A1* | 2/2010 | Amidi | G01S 5/0027 342/357.43 |
| 2010/0164720 A1* | 7/2010 | Kore | H04L 63/107 340/541 |
| 2011/0286437 A1* | 11/2011 | Austin | H04W 88/06 370/338 |
| 2012/0079567 A1* | 3/2012 | Van De Groenendaal | H04L 63/102 726/4 |
| 2013/0121194 A1* | 5/2013 | Heshmati | H04W 52/0258 370/252 |
| 2014/0003261 A1* | 1/2014 | Glllett | H04W 48/04 370/252 |
| 2014/0141795 A1* | 5/2014 | Abraham | H04W 24/00 455/456.1 |
| 2015/0085825 A1* | 3/2015 | Ishihara | H04W 52/0216 370/331 |
| 2015/0149591 A1* | 5/2015 | Gibbon | H04W 4/029 709/219 |
| 2015/0173008 A1* | 6/2015 | Siddam | H04W 48/18 455/434 |
| 2015/0215832 A1* | 7/2015 | Fitzpatrick | H04W 48/18 455/426.1 |
| 2016/0026998 A1 | 1/2016 | Tanner | |
| 2016/0157161 A1* | 6/2016 | Miao | H04W 64/00 455/434 |
| 2016/0157168 A1 | 6/2016 | Xue | |
| 2016/0192289 A1* | 6/2016 | Visuri | H04W 48/16 455/450 |

FOREIGN PATENT DOCUMENTS

| | | |
|---|---|---|
| WO | 0162034 A1 | 8/2001 |
| WO | 2004056136 A2 | 7/2004 |
| WO | 2017153286 A1 | 9/2017 |
| WO | 2018013047 A1 | 1/2018 |

OTHER PUBLICATIONS

European Search Report and Search Opinion from correlating European Application No. 19162449.3, dated Aug. 7, 2019; 8 pages.

* cited by examiner

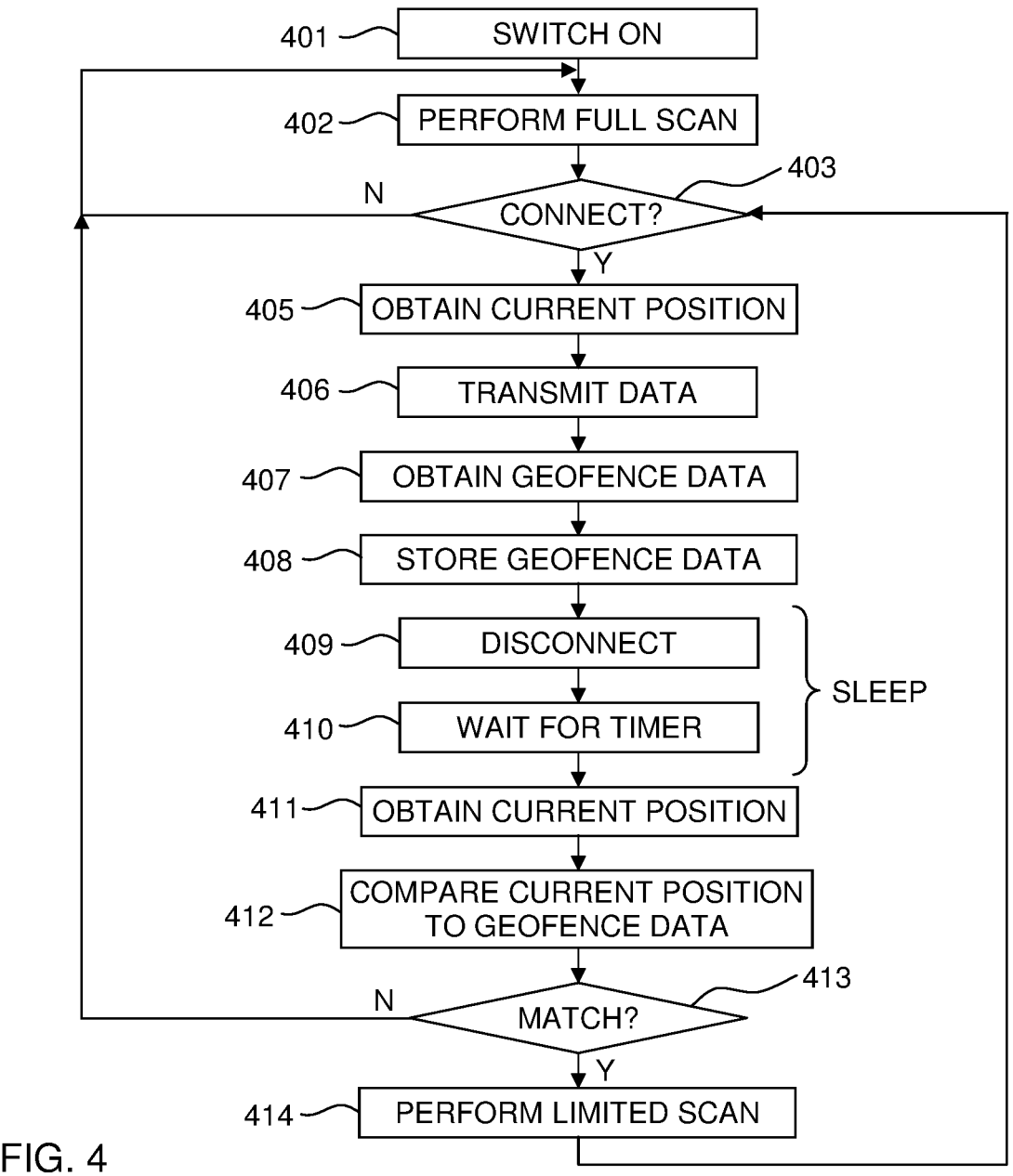

ESTABLISHING A WIRELESS CONNECTION TO A CELLULAR NETWORK

RELATED APPLICATION DATA

This application claims the benefit of Swedish Patent Application No. 1850431-6, filed Apr. 16, 2018, the disclosure of which is incorporate herein by reference in its entirety.

TECHNICAL FIELD

The present invention generally relates to electronic devices and, more particularly, to a technique of establishing a wireless connection to a cellular network in such electronic devices.

BACKGROUND

An electronic device for cellular communications may support wireless communications on plural radio frequency bands (also referred to as channels) for a radio access technology. The electronic device may also support multiple radio access technologies, in which case the electronic device may support one or more frequency bands for each of the supported radio access technologies. Typically, not all supported bands are used simultaneously. Rather, the electronic device is configured to switch to a desired frequency band and/or radio access technology using one or both of software or hardware tuning technologies. The total number of bands supported in current electronic devices varies depending on the specific electronic device, the manufacturer, the supported radio access technologies, etc. Exemplary cellular radio access technologies may operate in both the licensed and unlicensed frequency spectra and include, but are not limited to, GSM, GPRS, UMTS and LTE, and sub-categories thereof.

Typically, the electronic device has stored data regarding a default network (also referred to as a home network) to which it connects. However, there are situations in which the electronic device cannot find the default network. In this event, the electronic device starts a scan procedure in which each supported channel of each supported radio access technology is scanned to identify a network with which to communicate. This is often referred to as a "full band scan". Full band scanning can take up to several minutes to complete scanning of each supported channel, although the scanning may be interrupted if a certain condition occurs such as identifying a preferred network or finding another suitable radio access network. Typically, the scan involves scanning each supported channel in a serial manner (one after another) and in a default order.

Different techniques are known in the art to adapt the scanning order of the full band scan, to shorten the time required to establish a network connection. For example, US2016/026988 proposes to analyze subscription information available on the SIM card in the electronic device to identify a country or region of the world in which the electronic device is most likely being used. From the identified country or region, the electronic device configures a prioritized band scan order that starts with the most likely frequencies and radio access technologies. WO2017/153286 proposes to similarly prioritize the band scan order based on the probable location of the electronic device derived from application software on the electronic device, such as an appointment book, email, text messaging, social networking, etc. US2016/0157168 proposes to similarly prioritize the band scan order based on a current location determined by short-range wireless communication, e.g. based on a MAC address obtained from an incoming WiFi-signal.

Even if the full band scan is prioritized in accordance with the foregoing, a battery-powered electronic device that is frequently moved near or across borders of countries or regions that apply different radio access technologies and/or radio frequency bands may be rapidly drained of battery power.

SUMMARY

It is an objective of the invention to at least partly overcome one or more limitations of the prior art.

Another objective is to provide an energy-efficient technique of establishing a wireless connection to a cellular network in an electronic device that supports wireless connection to a plurality of cellular networks.

One or more of these objectives, as well as further objectives that may appear from the description below, are at least partly achieved by a method in an electronic device, a computer-readable medium and an electronic device according to the independent claims, embodiments thereof being defined by the dependent claims.

A first aspect of the invention is a method, performed in an electronic device, for establishing a wireless connection to a cellular network. The electronic device is configured to support wireless connection to a plurality of cellular networks. The method comprises: obtaining a current position of the electronic device; determining, as a function of the current position, a set of available cellular networks, said set being a subset of the plurality of cellular networks that are supported by the electronic device; and scanning the set of available cellular networks.

Additionally, in some embodiments, said determining the set of available cellular networks comprises determining a set of available radio access technologies and available radio frequency bands, wherein the scanning is performed on the available radio frequency bands by use of the available radio access technologies.

Additionally, in some embodiments, said determining comprises comparing the current position to one or more geofences associated with a respective set of available cellular networks.

Additionally, in some embodiments, the method further comprises, if the comparing results in a matching geofence, scanning the set of available cellular networks that is associated with the matching geofence, and, if the comparing results in no matching geofence, scanning the plurality of cellular networks supported by the electronic device.

Additionally, in some embodiments, the method further comprises: transmitting the current position to a server over the wireless connection; and receiving geofence data for the current position from the server over the wireless connection, said geofence data comprising one or more current geofences and a respective associated set of available cellular networks.

Additionally, in some embodiments, said one or more current geofences comprises a current geofence that includes the current position and at least one further geofence that is selected among a plurality of geofences other than the current geofence to be located within a predefined distance to the current position.

Additionally, in some embodiments, said one or more geofences are defined to respectively correspond to one or more countries, or a region within a country.

Additionally, in some embodiments, said one or more geofences are defined as one or more of a map, a polygon, a circle.

Additionally, in some embodiments, the current position and said one or more geofences are defined in geographical coordinates.

Additionally, in some embodiments, the method further comprises: intermittently operating to establish the wireless connection by said obtaining, determining and scanning; and transmitting data to one or more servers over the wireless connection, whereupon the wireless connection is disconnected.

Additionally, in some embodiments, the electronic device is a tracker for goods or persons in transit between different countries, and wherein said data comprises the current position of the electronic device.

A second aspect of the invention is a computer-readable medium comprising computer instructions which, when executed by a processor, cause the processor to perform the method of the first aspect.

A third aspect of the invention is an electronic device for establishing a wireless connection to a cellular network. The electronic device is configured to support wireless connection to plural cellular networks. The electronic device is further configured to: obtain a current position of the electronic device; determine, as a function of the current position, a set of available cellular networks, said set being a subset of the plurality of cellular networks that are supported by the electronic device; and scan the set of available cellular networks.

The electronic device of the third aspect may alternatively be defined to comprise: means for supporting wireless connection to plural cellular networks, means for obtaining a current position of the electronic device; means for determining, as a function of the current position, a set of available cellular networks, said set being a subset of the plurality of cellular networks that are supported by the electronic device; and means for scanning the set of available cellular networks.

The second and third aspects share the advantages of the first aspect. Any one of the above-identified embodiments of the first aspect may be adapted and implemented as an embodiment of the second and third aspects.

Still other objectives, as well as features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

FIG. 3 is a flow chart of a method performed by the electronic device in accordance with an embodiment.

FIG. 4 is a flow chart of method performed by the electronic device in accordance with another embodiment.

DETAILED DESCRIPTION OF EXAMPLE EMBODIMENTS

Figure 1:
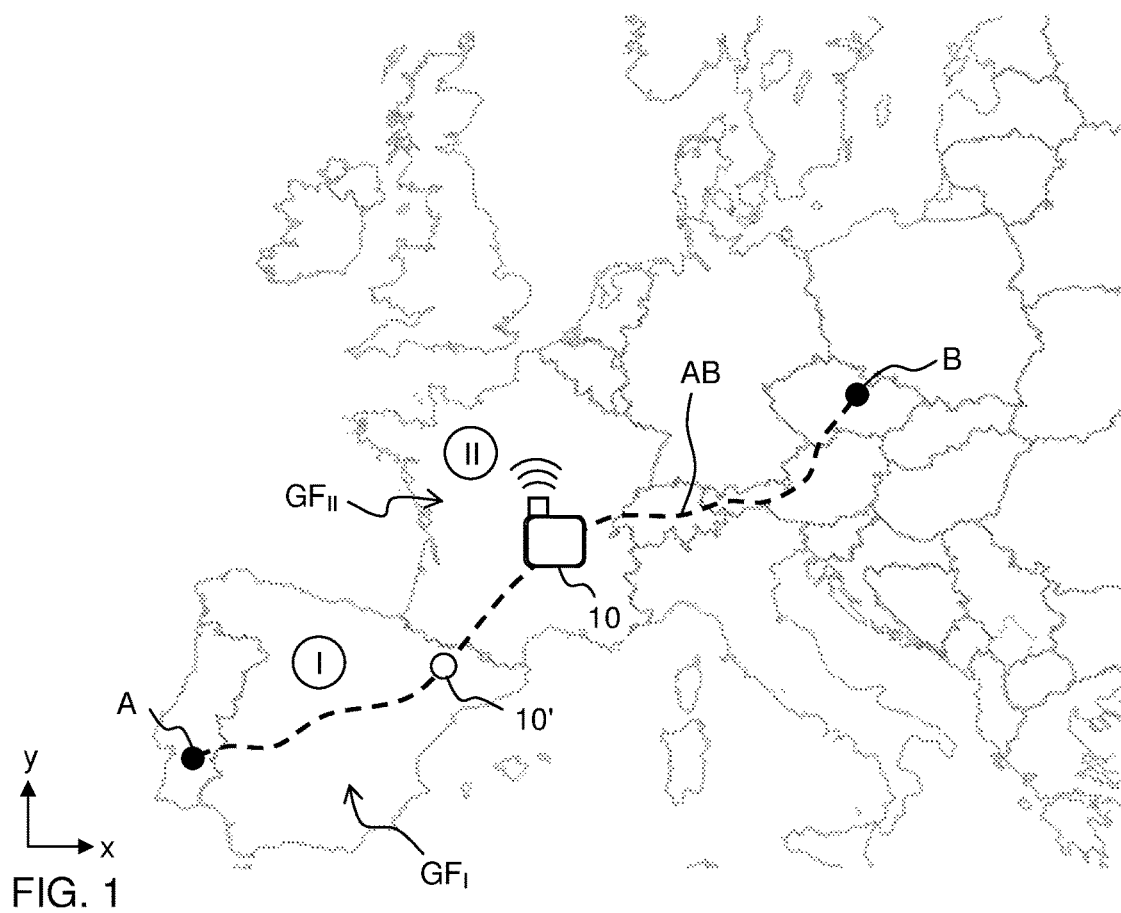
FIG. 1 illustrates an electronic device in transit between locations A and B.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention. As used herein, a "set" of items is intended to imply a provision of one or more items.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present invention. As used herein, the term "and/or" includes any and all combinations of one or more of the associated listed items.

Embodiments of the invention relate to a technique of reducing energy consumption in electronic devices for cellular communication. The electronic device is typically a portable electronic device and may take any form factor including, but not limited to a tracker device, a mobile telephone, a laptop computer, a gaming device, a camera, a media player, etc. Thus, although embodiments are presented in relation to a tracker device for tracking the location of goods or individuals in transit, the applicability of aspects of the invention is not limited to such tracker devices. Embodiments of the invention are suited for electronic devices that are powered by an on-board power supply unit such as a battery, a fuel cell, etc, and in particular low-power devices, including co-called IoT devices (internet-of-things devices).

FIG. 1 schematically shows a communications environment for an electronic device 10. In the communications environment, the electronic device may carry out wireless communication. To conduct wireless communication, the electronic device 10 establishes network connectivity with a cellular network. Typically, the connection is made to one of several available subscriber networks that service the physical geo-location of the electronic device 10. One of the networks may be a home network with which the electronic device 10 is provisioned to operate. But, in some situations, the home network may not be available in the physical geo-location of the electronic device 10. In that situation, the electronic device 10 may communicate through a cellular network other than the home network, e.g. by so-called roaming. The cellular networks are typically, but not necessarily, operated by respective cellular service telephone companies ("operators"). The cellular networks may be operated in the licensed and/or unlicensed frequency spectrum. Exemplary radio access technologies (RATs) for cellular networks include circuit-switched network technologies, including but not limited to, global system for mobile communications (GSM), code division multiple access (CDMA), wideband CDMA (WCDMA), and advanced or alternative versions of these standards, as well as packet-switched network technologies, including but not limited to general packet radio service (GPRS), universal mobile telecommunications system (UMTS), 3G, 4G, 4G long-term evolution (LTE), and advanced or alternative versions of these standards, as well as upcoming standards, such as 5G. It is also conceivable that connection is made in the unlicensed frequency spectrum, e.g. by use of RATs such as MulteFire, LoRa, Sigfox, etc.

Typically, the electronic device 10 is configured to support a number of different RATs so as to be operable in situations when a particular RAT is not available. Further, the electronic device 10 is configured to support communication on a plurality of radio frequency bands (RFBs) or channels for each RAT. In the following, each combination of RAT and RFB is considered to represent a respective cellular network.

FIG. 1 illustrates a situation in which the electronic device 10 is a tracker device in transit from a location A to a location B along a route or path AB which extends through a number of countries. It should be understood that the available RATs may differ between countries. This is particularly true when a new version of a RAT is to be implemented. As a non-limiting example, LTE standard versions for IoT (Internet-of-Things) devices, such as categories CatM1 and NB-IoT, will be introduced with different timing in different countries. It is thus not unlikely that the available RATs differ along the route AB in FIG. 1. Furthermore, the available frequency bands may differ between countries for the respective RAT and between operators within a country. Even if the same operator provides cellular network connection in different countries, the available frequency bands allocated to the operator may differ between countries.

In the situation shown in FIG. 1, the electronic device 10 will at least partly be located outside the coverage area of its home network, which is typically confined to a particular country. As explained in the Background section, a conventional electronic device for cellular communication, when located outside its home network, will perform a full band scan to identify a preferred network with which to communicate. Each full band scan requires a significant amount of energy and may potentially drain the on-board power supply unit of the electronic device when in transit along the route AB in FIG. 1. This problem is aggravated if the electronic device implements a power-saving function that causes the electronic device, or at least its communications circuitry, to be mainly turned off during transit and only be activated intermittently for short periods of time. Thus, when in low-power mode, the electronic device is not connected to a cellular network. Each time it is activated, the electronic device will initiate a full band scan if it is located outside the home network. Thus, any gains in energy consumption by the power-saving function will be significantly offset by the energy required for each full band scan.

Embodiments of the invention overcome this problem by providing the electronic device with access to connection data indicative of the available cellular networks (given by RATs and RFBs) at the current location of the electronic device, and by configuring the electronic device to perform, whenever necessary, a limited scan which is confined only to these available cellular networks.

Figure 2:
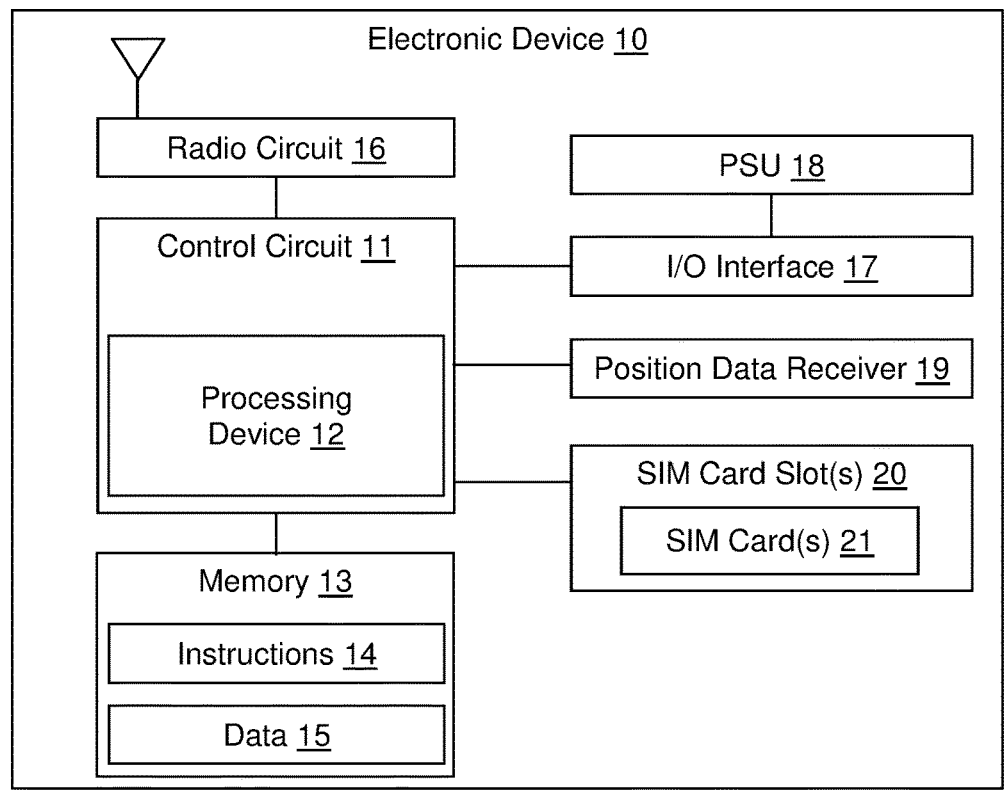
FIG. 2 is a block diagram of the electronic device.

Before explaining embodiments in more detail, an example structure of the electronic device 10 will be described with reference to the block diagram in FIG. 2. The electronic device 10 includes a control circuit 11 that is responsible for overall operation of the electronic device 10. For this purpose, the control circuit 11 includes a processing device or processor 12, which may be a central processing unit (CPU), microcontroller, microprocessor, ASIC, FPGA, or any other specific or general processing device. The processing device 12 may execute instructions 14 stored in a separate memory, such as memory 13, in order to carry out operation of the electronic device 10. The instructions 14 when executed by the processing device 12 may cause the electronic device 10 to perform any of the methods described herein. As indicated in FIG. 2, the memory 13 may also store data 15 for use by the processing device 12. The memory 13 may be, for example, one or more of a buffer, a flash memory, a hard drive, a removable media, a volatile memory, a non-volatile memory, a random access memory (RAM), or other suitable device. In a typical arrangement, the memory 13 includes a non-volatile memory for long term data storage and a volatile memory that functions as system memory for the control circuit 11. The memory 13 may exchange data with the control circuit 11 over a data bus. Accompanying control lines and an address bus between the memory 13 and the control circuit 11 also may be present. The memory 13 is considered a non-transitory computer readable medium. It is also conceivable that all or part of the instructions 14 and/or the data 15 is stored in a memory (not shown) within the control circuit 11.

The electronic device 10 includes communications circuitry that enables the electronic device 10 to establish the connection with a cellular network as described above. In the exemplary embodiment, the communications circuitry includes a radio circuit 16. The radio circuit 16 includes one or more radio frequency transceivers and an antenna assembly (or assemblies). Since the electronic device 10 is a multi-mode device capable of communicating using more than one standard (radio access technology) and over more than one radio frequency band, the radio circuit 16 represents at least one radio transceiver, at least one antenna, tuners, impedance matching circuits, and any other components needed for the various supported frequency bands and radio access technologies. The radio circuit 16 may further represent any radio transceivers and antennas used for short-range wireless communication, such as over a Bluetooth or Wi-Fi interface.

The electronic device 10 may further include one or more input/output (I/O) interface(s) 17. The I/O interface(s) 17 may be in the form of typical electronic device I/O interfaces and may include one or more electrical connectors for operatively connecting the electronic device 10 to another device via a cable. Further, operating power may be received over the I/O interface(s) 17 and power to charge a battery of a power supply unit (PSU) 18 within the electronic device 10 may be received over the I/O interface(s) 17. The PSU 18, e.g. comprising one or more batteries, may supply power to operate the electronic device 10 in the absence of an external power source.

The electronic device 10 may further include a position data receiver 19, such as a global positioning system (GPS) receiver, may be present to assist in determining the location of the electronic device 10 in a geographical coordinate system with a fixed relation to Earth, e.g. given by a combination of latitude, longitude and elevation as known in the art, or given by x, y (and optionally z) coordinates as indicated in FIG. 1.

As shown, the electronic device 10 also may include a SIM card slot 20 in which a SIM card 21 is received. As used herein, a "SIM card" has a generic meaning and includes not only SIM cards in the conventional meaning but equivalent units such UICC. The slot 20 includes any appropriate connectors and interface hardware to establish an operative connection between the electronic device 10 and the SIM card 21. The SIM card 21 may store items of information, such as one or more of a unique serial number (e.g., an integrated circuit card identifier or ICCID), an international mobile subscriber identity (IMSI), security authentication and ciphering information, temporary information related to a local network, a list of the services the user has access to, password data, etc. The uses and purposes of these items of information will be understood to those of ordinary skill in the art and will not be explained in detailed herein. In some cases, it is possible that no SIM card is present. In other cases, it is possible that two SIM cards 21 are installed in the electronic device 10.

Although not shown in FIG. 2, the electronic device 10 may include further components, such as a user input receiving user input for controlling operation of the electronic device 10, a display, one or more buttons, motion sensors (e.g., gyro sensors, accelerometers), and so forth.

FIG. 3 is a flow chart of a method performed by the electronic device 10 in accordance with an embodiment, e.g. during transit along the route AB in FIG. 1. The method is performed whenever the electronic device needs to establish a connection to a cellular network, e.g. upon activation from a low-power mode or when moving out of range of the cellular network to which it is connected. In step 300, the electronic device 10 obtains its current position, e.g. from the position data receiver 19 (FIG. 2). Alternatively or additionally, the electronic device 10 may estimate its current position based on one or more cell IDs or the like, obtained by the electronic device 10 the last time it was connected to a cellular network. The use of cell IDs for positioning is known in the art and will not be described in further detail. Alternatively or additionally, the electronic device 10 may estimate its current position based on a MAC address obtained by short-range wireless communication, e.g. as described in aforesaid US2016/0157168. In step 301, the electronic device 10 determines, as a function of the current position, a set of available cellular networks. In FIG. 3, the set of available networks is generally represented by connection data comprising [RAT], which designates the set of available RATs, and [RFB], which designates the set of available RFBs. In step 302, the electronic device 10 performs, by its radio circuit 16 (FIG. 2), a limited scan which is restricted to only the set of available cellular networks. The set of available cellular networks is generally a subset of the cellular networks that are supported by the radio circuit 16 in the electronic device 10. By this method, the electronic device is controlled to only scan for the cellular networks that might be available at the current location, whereas all other cellular networks are omitted from the scan. This reduces the required energy consumption in the electronic device 10 when establishing a connection to a cellular network.

In one embodiment, the method further comprises storing, in the memory 13 (FIG. 2), one or more geofences in association with connection data ([RAT], [RFB]) for a respective set of available cellular networks. Thus, the geofence(s) and the connection data form part of the data 15 in FIG. 2. In such an embodiment, step 301 may comprise comparing the current position to the one or more geofences stored in the memory 13. The geofence(s) may be pre-stored in the memory 13. Alternatively, as will be described further below, geofences may be retrieved by the electronic device 10 on demand, e.g. from a dedicated server. Each geofence may be defined in geographical coordinates to correspond to one or more countries or a region within a country. In one embodiment, the geofence is a map. In another embodiment, which is more memory efficient, the geofence is a polygon. Such a geofence may be defined by its vertices, the number of which may be selected to achieve sufficient conformity to the relevant geographical area (country/region). In yet another embodiment, which is even more memory efficient, the geofence is an ellipse or a circle.

In one embodiment, if the comparing in step 301 results in a matching geofence, i.e. a geofence that includes the current position, the electronic device 10 performs the limited scan of step 303 by scanning the set of available networks that is associated with the matching geofence. On the other hand, if the comparing in step 302 does not result in any matching geofence, i.e. if the current position is not included the geofence(s) stored in memory 13, the electronic device 10 may be caused to perform a full band scan among the cellular networks that are supported by its radio circuit 16.

In the example of FIG. 1, the electronic device 10 may store a first geofence $GF_I$ for region I (Spain) in association with a first set of networks, and a second geofence $GF_{II}$ for region II (France) in association with a second set of networks. Each set of networks may be given by one or more RATs ([RAT]) and one or more RFBs for each RAT ([RFB]). When moving into region I, the electronic device 10 will be unable to connect to a cellular network and is thereby caused to execute the method in FIG. 3 to establish a connection. Since the electronic device 10 then is located in region I, step 301 will match the current position to the first geofence $GF_I$, retrieve the associated first set of networks, and perform the limited scan for the first set. A corresponding procedure will be performed when the electronic device 10 moves into region II.

It should be noted that a network is "available" if it is accessible within the geographical area that corresponds to the geofence. This does not mean that the network is accessible everywhere within the geofence, but its coverage may vary within the geographical area. Thus, it is possible or even plausible that the electronic device 10 will connect by use of different RATs and/or RFBs within at least one of the geofences that are defined along the route AB in FIG. 1. By storing connection data for the set of available networks for the respective geofence, the electronic device 10 is likely to be able to establish a wireless connection to a cellular network by a limited scan.

Generally, to speed up the limited scan, the electronic device may be configured to dynamically define a scan order for the cellular networks that are included in the limited scan, e.g. by sorting the available networks based on the number of connections that have been established by the electronic device 10 to the respective network, and/or by starting the limited scan by the combination of RAT and RFB that was most recently used to connect the electronic device 10 to a cellular network.

It may be undesirable to pre-store a database containing all possible geofences and associated connection data in the memory 13 of the electronic device 10. Such a database may require significant memory space and may also need to be updated over time as new radio access technologies are introduced, old radio access technologies are discontinued, radio frequency bands are changed or removed, or new radio frequency bands are allocated.

Figure 5:
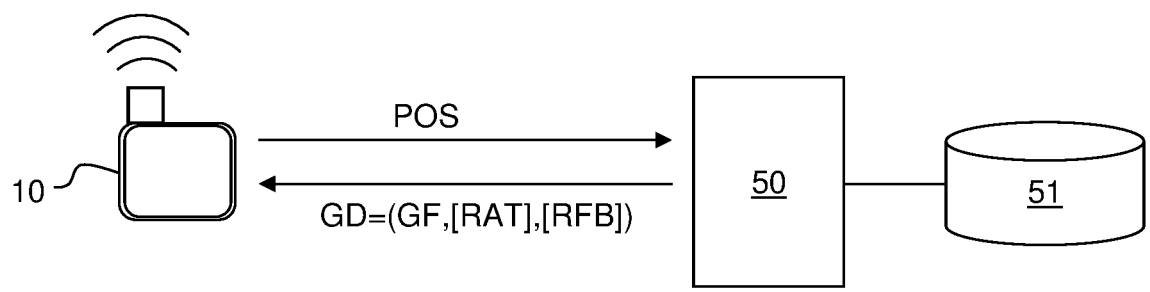
FIG. 5 illustrates data communication between the electronic device and a server.

In one embodiment, this problem is overcome by the electronic device 10 being configured to intermittently obtain geofence data from a server, e.g. when the electronic device is connected to a cellular network. The geofence data may comprise a current geofence and associated connection data (represented by [RAT] and [RFB]). An example of such an embodiment is shown in FIG. 5. Here, when connected to a cellular network, the electronic device 10 transmits its current position (POS, e.g. obtained by step 300) to a server 50. The server 50 accesses a database 51, which associates geofences with connection data for available cellular networks, identifies a current geofence that includes the current position and returns, to the electronic device 10, geofence data GD comprising the current geofence GF, the available radio access technologies [RAT] for the current geofence GF, and the available radio frequency bands [RFB] for the current geofence GF. The electronic device 10 receives the geofence data GD and stores it in memory 13, for use the next time the electronic device 10 needs to establish a wireless connection to a cellular network. In a variant, the electronic device 10 transmits, together with the current position POS, a subscription identifier indicative of the cellular networks that are available for this specific electronic device 10. This variant may speed up the limited scan, by reducing the number of cellular networks to be scanned. The subscription identifier may be the IMSI stored on in the SIM card 21 (FIG. 2), or part of the IMSI. Such a subscription identifier allows the server 50 to determine the cellular networks that are available to the electronic device 10 within the geofence by roaming for the operator that is associated with the SIM card 21. Alternatively, the subscription identifier may be a device identifier that uniquely identifies the electronic device 10, and the database 51 may associate geofences with connection data for each device identifier.

In one embodiment, the server 50 is configured to prioritize among the set of available networks, e.g. based on available operators, price plan, etc, and include the prioritization in the geofence data. In one example, combinations of RATs and RFBs may be sorted in a prioritized order in the geofence data. In another example, the server 50 adds a prioritization value to the RATs and/or RFBs in the geofence data, so as to enable the electronic device 10 to perform the limited scan in accordance with the prioritization by the server 50.

Reverting to FIG. 1, it may be realized that the electronic device 10 that obtains geofence data GD from the server 50 may be required to perform a full band scan when it crosses a border between two countries that provide different cellular networks. If the electronic device is unable to connect to a cellular network after crossing the border, it will be unable to provide its current position to the server 50 and will not receive geofence data GD for the country it just entered. If the electronic device 10 is switched on and operable to connect to cellular networks at all times, this may be less of a problem since cellular networks typically extend across borders to some extent. However, the problem is aggravated if the electronic device 10 intermittently operates to disconnect its wireless connection, e.g. by entering a low-power mode to save energy, since the electronic device 10 may then happen to be disconnected when it approaches and crosses the border.

In one embodiment, this problem is overcome by the geofence data from the server 50 including not only the current geofence (i.e. the geofence that includes the current position), but also the geofence that is located closest to the current position, and associated connection data for the respective geofence. It is also conceivable that the geofence data includes more than one neighboring geofence and associated connection data. In one example, the server 50 may be configured to include such a neighboring geofence whenever the current position is within a predefined distance from another geofence. Reverting to FIG. 1, this means that the electronic device 10, when in location 10', will receive not only the first geofence $GF_I$ and its associated connection data but also the second geofence $GF_{II}$ and its associated connection data. Thereby, when the electronic device 10 has crossed the border to region II and should establish a wireless connection to a cellular network, it will find a matching geofence for the current position in memory 13 and perform a limited scan.

FIG. 4 is a flow chart of a detailed example of a method performed by an electronic device 10 that intermittently enters a low-power mode. In step 401, the electronic device 10 is switched on. The method then proceeds to perform a full band scan (step 402). If step 403 finds that no wireless connection has been established, the method may retry to establish a connection by performing another full band scan (step 402). If step 403 finds that that the electronic device 10 is connected to a cellular network, the method proceeds to step 405, which obtains a current position of the electronic device, e.g. from the receiver 19 (FIG. 2). Step 406 may then transmit data to a receiving computer over the cellular network. The data may be any type of data that the electronic device 10 is configured to report, e.g. measurement data from one or more sensors attached to or included in the electronic device 10. In one example, the electronic device 10 is a tracking device that reports its current position. The receiving computer may but need not be the server 50 in FIG. 5. In step 407, the method obtains geofence data as described with reference to FIG. 5, i.e. by transmitting the current position to the server 50. Thus, the geofence data contains the current geofence and associated connection data, and may also contain one or more neighboring geofences and associated connection data. In step 408, the geofence data is stored in the electronic device. The method then proceeds to set the electronic device 10 in low-power or sleep mode. When entering the sleep mode, the electronic device 10 disconnects from the cellular network (step 409), starts a timer and waits (step 410) for the timer to indicate that the electronic device 10 should leave the sleep mode. The duration of the sleep mode may be set, e.g., based on the required rate of data transmission (step 406). In the example of a low-power tracker device, the duration of the sleep mode may, e.g., be set in the range of 10 minutes to 2 hours. Upon leaving the sleep mode, the method proceeds to step 411, which obtains the current position of the electronic device 10, in the same way as step 405. Step 412 then compares the current position to the stored geofence data. If step 413 determines that the current position does not fall within the geofence(s) stored in memory, the method proceeds to step 402 to perform a full band scan. If the current position matches a geofence in step 413, the method proceeds to step 414, which retrieves the connection data associated with the geofence from memory and operates the radio circuit 16 to perform the limited scan for [RAT], [RFB] as given by the connection data. If the limited scan results in a wireless connection to a cellular network (step 403), the method proceeds to step 405, otherwise a full band scan may be performed (step 402).

With reference to the example in FIG. 4, it is realized that the provision of the limited scan will generally reduce energy consumption. Further, the need for local data storage and maintenance will be reduced when the geofence data is obtained on demand from a server. Still further, the number of full band scans and thus energy consumption is further reduced by including neighboring geofence(s) and associated connection data in the geofence data from the server.

We claim:

1. A method, performed in an electronic device, for establishing a wireless connection to a cellular network, the electronic device being configured to support wireless connection to a plurality of cellular networks, said method comprising:
   obtaining a first current position of the electronic device;
   receiving geofence data for the first current position from an associated server over a first wireless connection, the geofence data comprising:
      first geofence data representative of i) a first geofence that includes the first current position, and ii) a first set of available cellular networks associated with the first geofence, and
      further geofence data representative of a second set of available cellular networks associated with a further geofence, the further geofence being selected by the associated server among a plurality of geofences other than the first geofence to be located within a predefined distance of the first current position;
   obtaining a second current position of the electronic device;
   determining a set of available cellular networks by:
      comparing the second current position with the first and second geofences; and
      selecting as the determined set of available networks:
         i) the first set of available cellular networks associated with the first geofence for the second current position of the electronic device being within the first geofence, or
         ii) the second set of available cellular networks associated with the further geofence for the second current position of the electronic device being within the further geofence,
      wherein each of said first and second sets of available cellular networks are subsets of the plurality of cellular networks that are supported by the electronic device; and
   scanning the determined set of available cellular networks.

2. The method of claim 1, wherein said determining the set of available cellular networks comprises determining a set of available radio access technologies and available radio frequency bands, wherein the scanning is performed on the available radio frequency bands by use of the available radio access technologies.

3. The method of claim 1, further comprising transmitting the first current position to the associated server over the first wireless connection.

4. The method of claim 1, further comprising:
   scanning the plurality of cellular networks supported by the electronic device based on the second current position of the electronic device not being within either of the first or the further geofences.

5. The method of claim 1, further comprising:
   establishing a second wireless connection based on the scanning the second set of available cellular networks as the determined set of available networks.

6. The method of claim 1, wherein said first and further geofences are defined to respectively correspond to first and second countries, or to first and second regions within a country.

7. The method of claim 1, wherein said first and further geofences are defined as one or more of a map, a polygon, and a circle.

8. The method of claim 1, wherein the first and second current positions and said first and further geofences are defined in geographical coordinates.

9. The method of claim 1, further comprising:
   intermittently operating the electronic device, wherein the first wireless connection is disconnected after the receiving the geofence data for the first current position from the associated server over the first wireless connection, and before the obtaining the second current position of the electronic device; and
   transmitting data to one or more servers over the first wireless connection.

10. The method of claim 9, wherein the electronic device is a tracker for goods or persons in transit between different countries, and wherein said data comprises the first current position of the electronic device.

11. A non-transitory computer-readable medium comprising computer instructions that, when executed by a processor of an associated electronic device, cause the processor to perform steps comprising:
   obtaining a first current position of the associated electronic device;
   receiving geofence data for the first current position from an associated server over a first wireless connection, the geofence data comprising:
      first geofence data representative of i) a first geofence that includes the first current position, and ii) a first set of available cellular networks associated with the first geofence, and
      further geofence data representative of a second set of available cellular networks associated with a further geofence, the further geofence being selected by the associated server among a plurality of geofences other than the first geofence to be located within a predefined distance of the first current position;
   obtaining a second current position of the associated electronic device;
   determining a set of available cellular networks by:
      comparing the second current position with the first and second geofences; and
      selecting as the determined set of available networks:
         i) the first set of available cellular networks associated with the first geofence for the second current position of the associated electronic device being within the first geofence, or
         ii) the second set of available cellular networks associated with the further geofence for the second current position of the associated electronic device being within the further geofence,
      wherein each of said first and second sets of available cellular networks are subsets of the plurality of cellular networks that are supported by the associated electronic device; and
   scanning the determined set of available cellular networks.

12. An electronic device for establishing a wireless connection to a cellular network, said electronic device being configured to support wireless connection to plural cellular networks, said electronic device being further configured to:
- obtain a first current position of the electronic device;
- receive geofence data for the first current position from an associated server over a first wireless connection, the geofence data comprising:
  - first geofence data representative of i) a first geofence that includes the first current position, and ii) a first set of available cellular networks associated with the first geofence, and
  - further geofence data representative of a second set of available cellular networks associated with a further geofence, the further geofence being selected by the associated server among a plurality of geofences other than the first geofence to be located within a predefined distance of the first current position;
- obtain a second current position of the electronic device;
- determine a set of available cellular networks by:
  - comparing the second current position with the first and second geofences; and
  - selecting as the determined set of available networks:
    - i) the first set of available cellular networks associated with the first geofence for the second current position of the electronic device being within the first geofence, or
    - ii) the second set of available cellular networks associated with the further geofence for the second current position of the electronic device being within the further geofence,
  - wherein each of said first and second sets of available cellular networks are subsets of the plurality of cellular networks that are supported by the electronic device; and
- scan the determined set of available cellular networks.

13. The electronic device of claim 12, further configured to determine the set of available cellular networks as a set of available radio access technologies and available radio frequency bands, and to scan the available radio frequency bands by use of the available radio access technologies.

14. The electronic device of claim 12, further configured to transmit the first current position to the associated server over the first wireless connection.

15. The electronic device of claim 12, further configured to scan the plurality of cellular networks supported by the electronic device based on the second current position of the electronic device not being within either of the first or the further geofences.

16. The electronic device of claim 12, further configured to:
- establish a second wireless connection based on the scanning the second set of available cellular networks as the determined set of available networks.

17. The electronic device of claim 12, further configured to:
- intermittently operate to disconnect the first wireless connection after receiving the geofence data for the first current position from the associated server over the first wireless connection, and before the obtaining the second current position of the electronic device; and
- transmitting data to one or more servers over the first wireless connection.

18. The electronic device of claim 17, wherein the electronic device comprises a tracker for goods or persons in transit between different countries, wherein said data comprises the first current position of the electronic device.

* * * * *